United States Patent [19]

Bujese

[11] 4,148,578
[45] Apr. 10, 1979

[54] RECIPROCATING CARRIAGE DRIVE SYSTEM

[75] Inventor: David P. Bujese, Toms River, N.J.

[73] Assignee: Pitney-Bowes Inc., Stamford, Conn.

[21] Appl. No.: 901,203

[22] Filed: Apr. 28, 1978

[51] Int. Cl.² .......................................... G03G 15/28
[52] U.S. Cl. .......................................... 355/8; 355/11
[58] Field of Search .................. 355/8, 11, 50, 51, 66, 355/81, 84

[56] References Cited

U.S. PATENT DOCUMENTS

| | | | |
|---|---|---|---|
| 3,554,640 | 1/1971 | Hoskins | 355/8 |
| 3,672,762 | 6/1972 | Suzuki et al. | 355/8 X |
| 3,957,368 | 5/1976 | Goshima et al. | 355/8 |

Primary Examiner—R. L. Moses
Attorney, Agent, or Firm—Martin D. Wittstein; William D. Soltow, Jr.; Albert W. Scribner

[57] ABSTRACT

An electrophotocopy machine has two friction clutches for driving a reciprocating carriage from a home position, across an illuminating station and back to a home position. One clutch is continuously engaged to drive the carriage toward its home position and to exert a vibration dampening drag on the carriage when the second clutch is selectively engaged to drive the carriage forward across the illuminating station.

8 Claims, 14 Drawing Figures

Fig. 2

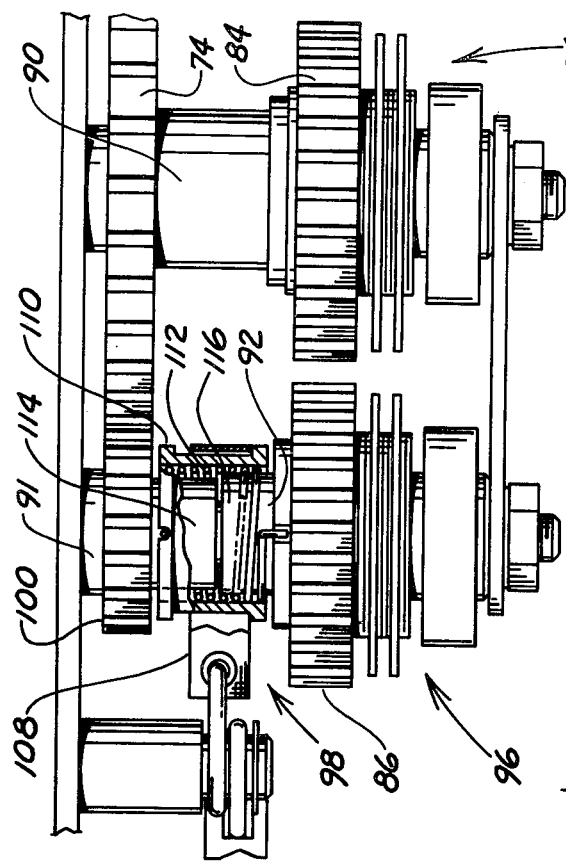
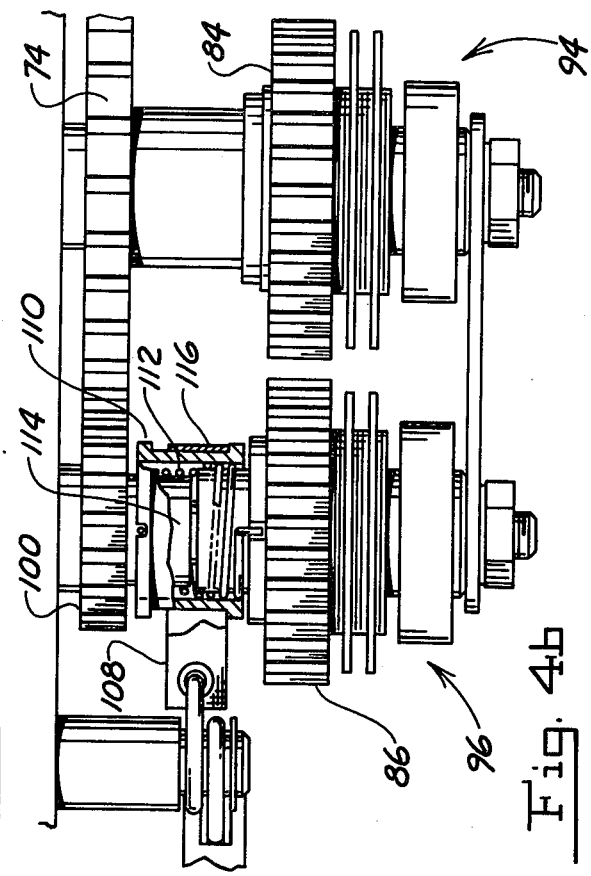
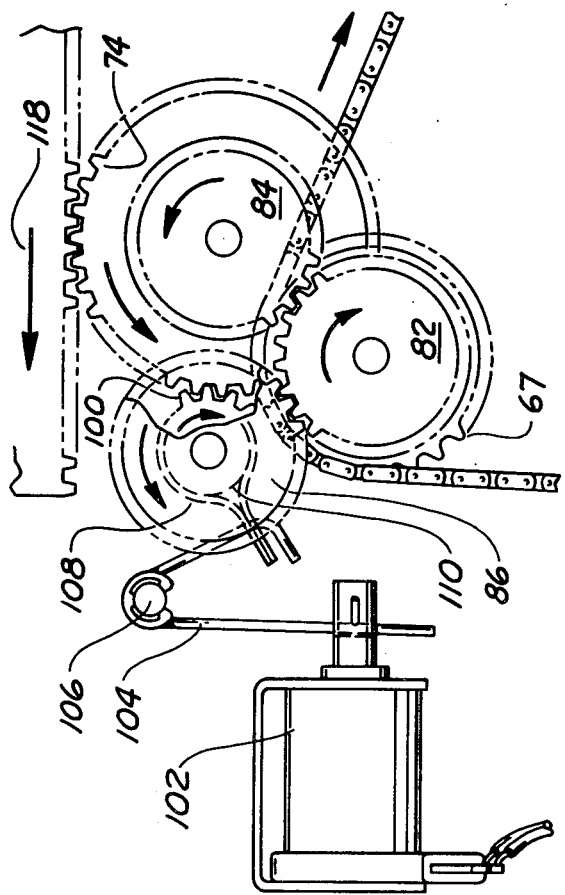
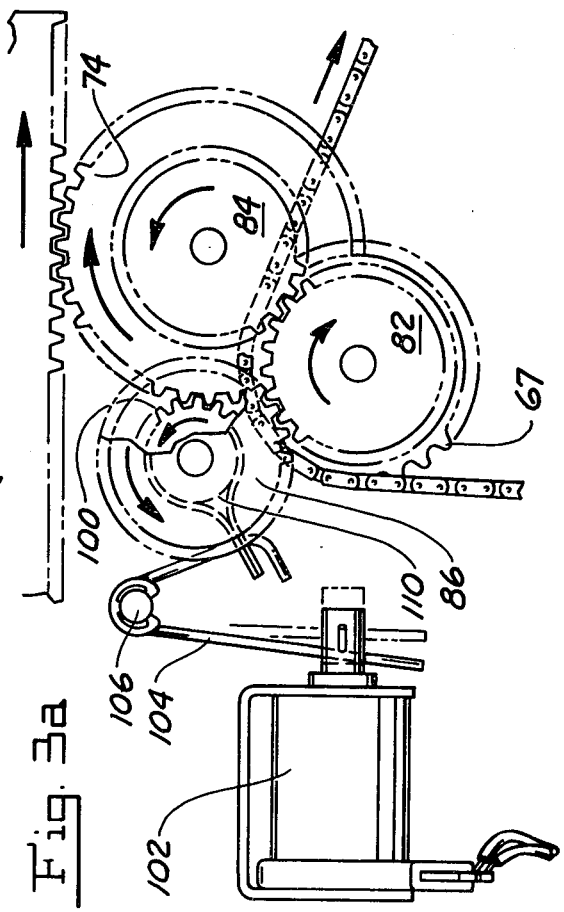

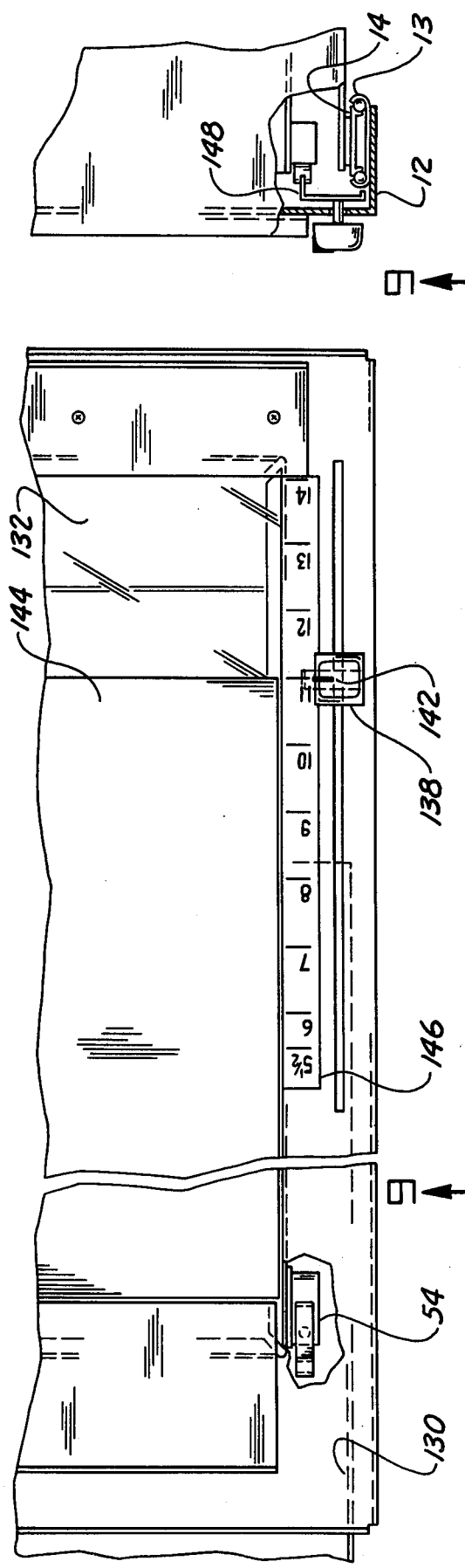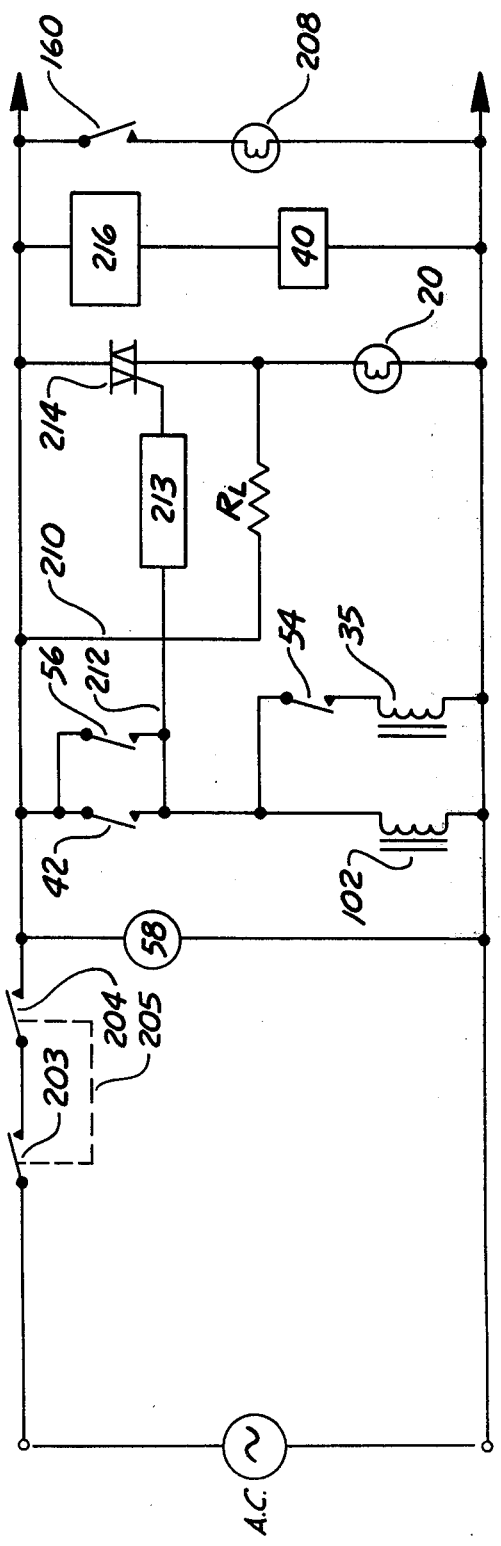

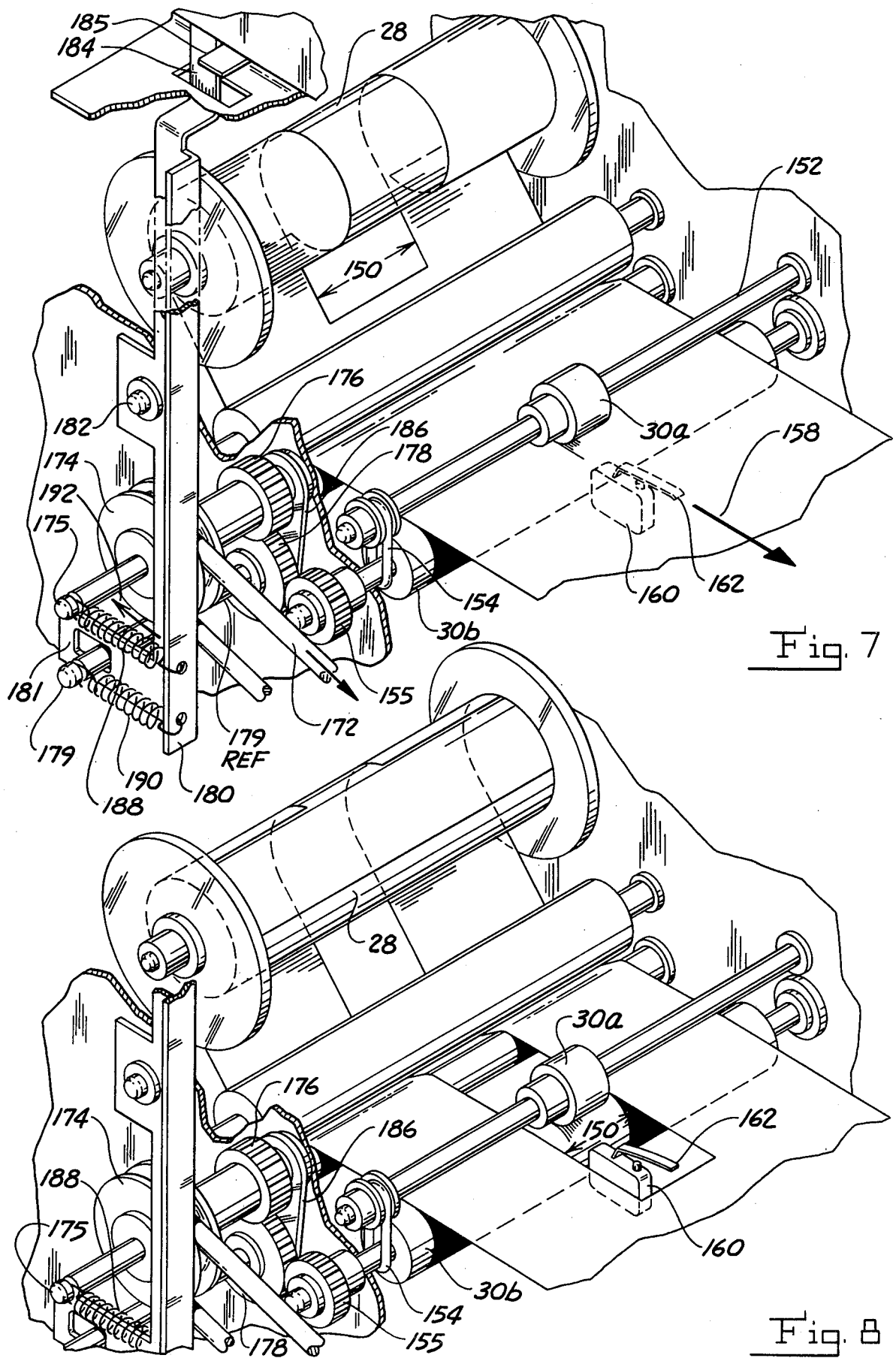

RECIPROCATING CARRIAGE DRIVE SYSTEM

BACKGROUND

1. Field of the Invention

This invention relates to electrophotocopy machines and, in particular, to a drive system for a reciprocating carriage that is mounted on such a machine.

Electrophotocopy machines are well known devices that are used for reproducing all forms of documents. These machines are usually either of the plain paper type or the coated paper type. The plain paper machines have a reuseable photoconductor and produce a copy on bond paper. The coated paper machines use a special paper that has been treated with a photosensitive substance so that the copy sheet functions as the photoconductor. These machines include a number of processing stations. At one station, the photoconductor is uniformly electrostatically charged. At another, the document to be copied is illuminated. At an imaging station the charged photoconductor is exposed to an image of the illuminated document to selectively discharge light struck areas of the photoconductor thereby forming a latent electrostatic image thereon. At a developing station, the latent image is developed by applying either a wet or dry type developer. In plain paper copiers, the developed image is thereafter transferred to a plain paper copy sheet. Finally, the toner is fixed to the copy sheet in one of a number of well known ways in order to yield a finished copy.

It is readily apparent from the foregoing description that the exposing and imaging stations perform an important function in copying machines because they provide the nexus between the document and the photoconductor. There are a number of configurations and combination of such stations. One kind of machine includes a sheet handling and feeding apparatus for moving an original document across a fixed, transparent illumination slit. Such machines, however, cannot handle bulky documents such as books. Another kind of machine uses a stationary, flat glass platen on which a book or single folio document is illuminated by a flash lamp. A lens focuses the flashed image onto a substantially flat photoconductor. Other stationary platen machines scan expose the photoconductor to the document by means of a movable mirror, lens and lamp arrangement. Still other machines use a fixed lens, mirror and lamp arrangement combined with a movable carriage that carries a document face down on a transparent platen across an illuminating station. The carriage and the photoconductor move in synchronism past the respective exposure and imaging stations. The reciprocating carriage kind of machine is favored for its relative simplicity of manufacture, ease of operation and compactness of size.

2. Description of the Prior Art

The prior art includes a number of machines that use a reciprocating document carriage. In U.S. Pat. No. 3,697,165 a carriage is linked with a lost motion coupling to a drive chain that is mounted on sprockets positioned adjacent to the carriage transfer and home positions. As the carriage link begins to pass around the underside of the sprocket, the link actuates a reversing switch effective to shift a transmission to drive the carriage in the opposite direction. Other chain loop and link drive mechanisms are found in U.S. Pat. Nos. 3,779,114 and 3,424,526. Still other drive mechanisms include a pair of racks mounted on a carriage and oppositely driven pinions alternately movable into and out of engagement with the racks, a pulley and belt arrangement with the belt driven in sequentially opposite directions by the alternate actuation of two oppositely driven electromagnetic clutches, and a pulley, clutch, spring return mechanism where the carriage is driven in one direction and a reset spring is tensioned to return the carriage to its initial position. Examples of the foregoing drives can be found in U.S. Pat. Nos. 3,424,526, 3,804,512 and 3,734,604. These prior art mechanisms suffer from one or more defects, including multiple electromagnetic clutches, high mechanical stresses on driving elements during reversal of carriage travel direction and complex electromechanical actuating circuits and apparatus.

Therefore, it is an object of this invention to provide a simple drive mechanism for a reciprocating carriage of an electrophotocopy machine.

It is another object to provide a drive mechanism normally engaged with the carriage for driving the carriage in one direction.

A further object is to provide an electrophotocopy machine having improved book copying capabilities.

Still another object is to provide an electrophotocopy machine wherein the carriage is capable of being translated through its non-copying stroke at a more rapid rate than its copying stroke.

Yet another object is to provide an electrophotocopy machine having improved drive means for reciprocating an original document carriage.

A further object is to provide a copy sheet supply apparatus that prevents the feeding of copy sheet slivers.

Another object is to provide an apparatus for actuating a copy paper feed means in response to the position of the carriage.

It is also an object to provide a control system having a common actuating means for actuating the illuminating station, controlling the direction of travel of the carriage and the operation of a severing means for cutting copy sheets from a web of copy paper.

An additional object is to provide an electrophotocopy machine which is simple in design, inexpensive to manufacture, efficient and reliable in operation.

It is another object to drive the carriage to a home position as soon as the machine is energized.

These and other objects of the invention will become apparent hereinafter.

SUMMARY OF THE INVENTION

In accordance with the present invention, there is provided an office electrostatic copier of compact, desk top size having a reciprocating carriage for accomodating original document sheets and bulk documents (such as books and the like) for movement past an illuminating station. The carriage is mounted on top of the copier machine and includes a transparent platen on which a document to be copied is placed face down. When the copier is energized, the drive system moves the carriage to the home position if the carriage is not already there. Upon initiation of a print cycle, the carriage is moved from a home position through a forward stroke during which the illuminating station is actuated, and the document is scanned. When the carriage reaches a predetermined transfer or reversal position concluding the forward stroke, its direction of movement is reversed for a return stroke at a faster rate to rapidly move the carriage to the home position for the next print cycle.

The copier of the preferred embodiment is of the coated copy paper type and includes a dry developer. The passage of the original document through the illuminating station is synchronized to the movement of the copy sheet through the imaging station. To this end a sensing means is disposed at the imaging station for sensing the leading edge of the copy sheet in order to synchronize the forward movement of the carriage with the copy sheet upstream of the imaging station, a pair of charging rollers uniformly charge the copy sheet. When the carriage is in the home position the leading edge of the document is at the illuminating station and the carriage will move at the same rate as the copy sheet on the forward stroke. The return stroke of the carriage is relatively faster than the forward stroke so that the next print cycle can begin as soon as the carriage returns to the home position.

An improved drive system for reciprocating the document carriage includes a first frictionally coupling slip clutch for delivering a predetermined frictional torque acting in one direction from a main drive motor to a carriage driving means (such as a rack and pinion) for continuously driving the carriage toward its home position in the absence of a greater, counter-torque. A second or forward coupling means (including a second slip clutch and an electromagnetically actuated wrap spring clutch) normally idly engages the carriage driving means and is actuable to couple the motor to the carriage driving means with a second frictional counter-torque large enough to overcome the frictional coupling of the first slip clutch and thereby drive the carriage in the forward direction. In its transit across the illuminating station, the torque of the first clutch acts as a substantially constant drag on the carriage. That drag tends to dampen unwanted vibrations (jitter) in the carriage's motion so that the carriage moves smoothly in the forward direction. After the carriage travels a predetermined distance (at least long enough for completely exposing a document), a sensing means deactuates the forward coupling means, the first slip clutch resumes its normal driving function and the carriage returns to the home position. A home end stop mounted on the machine prevents the carriage from being driven off the top of the copier, and the friction clutch slips once again until the copier is de-energized (after the last copy in a multiplicopy sequence) of another print cycle is initiated.

More specifically, the drive system of the invention includes a rack gear mounted on the underside of the carriage. A driven pinion gear is in mesh with the rack for moving the carriage back and forth depending upon the direction in which the pinion is turned. A first driving gear is coupled to the pinion by a first friction slip clutch so that a homeward directed torque is normally coupled to the pinion to thereby drive the carriage to the home position whenever the copier is energized. A forward driving gear is in mesh with the pinion and normally turns idly therewith. A second driving gear, driven through a second friction slip clutch, turns in a direction opposite to the first driving gear. The second driving gear is selectively coupled to the forward driving gear by a solenoid actuated wrap spring clutch. When the solenoid is actuated, the spring clutch transmits a forward driving torque from the second driving gear to the forward driving gear that is in mesh with the homewardly driven pinion. The forward torque (i.e., the torque transmitted through the second slip clutch and the wrap spring clutch) thus transmitted to the pinion is greater than the homeward torque and so the first friction clutch on the pinion slips and the carriage is driven in the forward direction. After the document is fully scanned, the solenoid is deactuated, the wrap sring clutch is disengaged, the forward torque ceases and the first slip clutch frictionally re-engages the pinion which in turn drives the carriage homeward.

By virtue of this arrangement, the entire operation of the carriage is simply controlled by a single actuating element, the solenoid actuated wrap spring clutch. The other elements of the drive systems are fixedly mounted in their respective operable positions and react passively to the torque changes that are initiated by the spring clutch. The spring clutch has the added capability of rapidly and smoothly engaging the forward driving gear so that the carriage quickly assumes its proper scanning speed on the forward stroke. Since imaging is carried out on the forward stroke, the time to produce a first copy is substantially less than the time required by machines which scan on the return stroke.

A further feature of the invention is that both slip clutches function as safety devices for uncoupling the forward or reverse drive gear in the event that the motion of the carriage is inhibited by an obstruction. For example, an operator might inadvertently place his hand in the path of the carriage. Upon abutting against the hand or other obstacle, the second clutch will slip thereby avoiding and thus preventing injury to the operator as well as to the machine drive system.

The invention solves the recurring problem of how to prevent the cutting of slivers from a nearly exhausted web of copy paper.

The invention accordingly comprises the features of construction, combination of elements and arrangement of parts that are exemplified in the preferred embodiment hereinafter described. The scope of the invention will be particularly pointed out and distinctly indicated in the claims.

For a fuller understanding of the nature and objects of the invention, reference should be made to the following detailed description taken in connection with the accompanying drawings, in which:

FIG. 2 is a broken away perspective view illustrating the carriage, the carriage drive system, and the driving mechanism for the other components in the machine;

FIG. 3a is a partial broken away elevation view of the carriage drive system with the solenoid actuated wrap spring clutch disengaged;

FIG. 3b is the same view as FIG. 3a with the spring clutch engaged to drive the carriage in the forward direction;

FIG. 4a is a plan view of FIG. 3a;

FIG. 4b is a plan view of FIG. 3b;

FIG. 5 is a partial plan view of the carriage

FIG. 6 is a partial elevation view of the horizontal slide rails;

FIG. 7 is a perspective view of the copy paper supply roll and feeding mechanism;

FIG. 8 is similar to FIG. 7 and shows an exhausted copy supply roll;

FIG. 10 is a combined electrical schematic and block diagram of the electrical systems in the copier;

DETAILED DESCRIPTION

Figure 1:
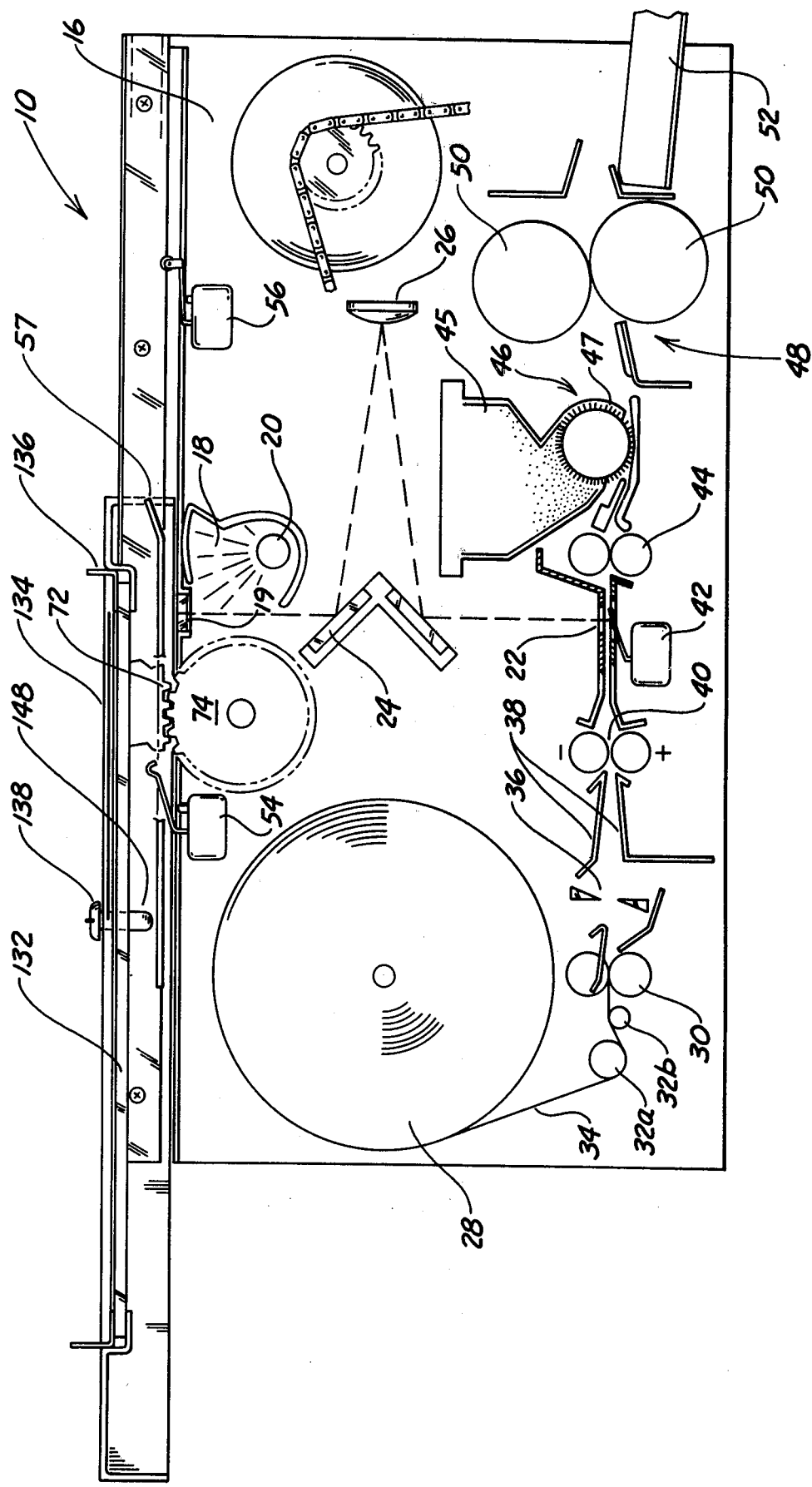
FIG. 1 is a schematic, elevation view of the principal operating features of an electrostatic copier machine in which the present invention is utilized.

The copier is a compact, table top size machine, which has external dimensions as small as 11"×16"×21" (width, height and length, respectively), delivers a first copy in four to five seconds and can make subsequent copies as fast as twelve copies per minute. FIG. 1 illustrates schematically an office photocopier, generally indicated at 10, to which the reciprocating document carriage of the invention generally indicated at 12, may be adapted. As will be seen from FIGS. 1 and 2, the document carriage 12 is mounted by horizontal side rails 14 (one on each side) atop the photocopier 10 and extending along the length of the housing 16 for reciprocating movement between a home position at the extreme left of FIG. 1 and a transfer position at the extreme right. An original document sheet (or book) bearing the image to be copied is placed face down on the carriage 12 which is reciprocated across an illuminating station, generally indicated at 18. The illuminating station 18 is illuminated by a light source 20 during the forward stroke of the carriage 12 from its home position to its transfer position. An image of the original document is onto a copy sheet at an imaging station, generally indicated at 22, by way of a dual mirror 24 and a reflective lens 26.

Copy paper having a suitable photoconductive coating, such as Electrofax paper having a zinc oxide coating on one side is withdrawn from a supply roll 28 by initial feed rollers 30. Idler rollers 32a,b serve to tension and decurl the copy paper 34 as it is withdrawn from the roll 28 by rollers 30. The copy paper is cut into a selected sheet length, typically corresponding to the sheet length of the original document, by a severing mechanism, generally indicated at 36. The copy paper is led by guides 38 into the nip of charging rollers 40 which operate to place a uniform electrostatic charge on the photoconductive of the copy paper. A detailed description of the charging rollers may be found in U.S. Pat. No. 3,778,690. Charging rollers 40 move the copy paper through the imaging station 20 at the same time and at the same speed as the original document passes through the illuminating station 18 during the forward carriage stroke.

In accordance with well-known electrostatic copying techniques, the image to be copied is projected on the photoconductive coating in contact engagement with a conductive substrate of the copy paper sheet. The conductive substrate is effective to selectively discharge the uniform electrostatic charge on the photoconductive coating in accordance with the image light intensity projected by the lens 26. The image of the indicia borne by the original document is transformed into a corresponding latent electrostatic image on the zinc oxide coating of the copy paper. The copy paper is then fed by feed rollers 44 through a developing station, generally indicated at 46, where the latent electrostatic image is developed using a suitable toner preferably of the pressure-fixable type. A supply of toner particles is contained in a hopper 45. Toner is picked up in the hopper 45 by a rotating magnetic brush 47 which carries the toner particles into contact with the copy sheet that passes underneath the magnetic brush 47. The toner particles are attracted to and loosely adhere to the latent electrostatic image on the copy sheet to thereby form a developed toner image. From the developing station 46, feed rollers 44 continue to convey the copy sheet into the a fixing station, generally indicated at 48, where the toner image is fixed to the copy sheet as it passes through the nip of pressure fixing rollers 50. The fixing rollers 50 convey the copy sheet to a tray 52 (shown partially broken away) where successive copies may be accumulated for ultimate removal by an operator.

Figure 2:
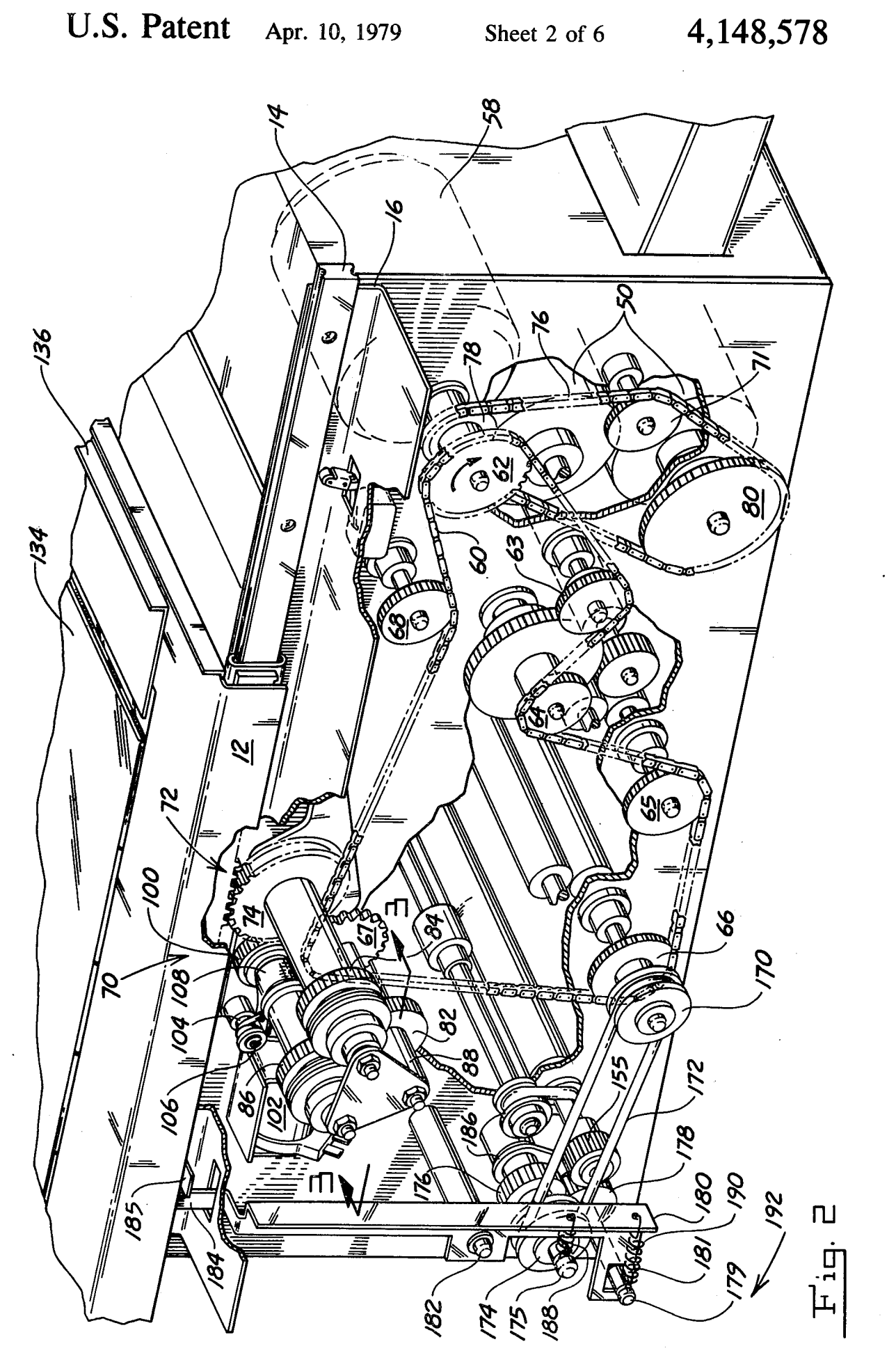

Referring now to FIG. 2, a motor 58 drives a continuous main drive chain 60 off of a main drive sprocket 62. The drive chain 60 further engages various idler and drive sprockets 63 through 68; the drive sprockets being drivingly connected to the various feed roller pairs operating to convey the copy paper through its processing stations, to the developing station and to the carriage drive system generally indicated at 70. A rack gear 72 mounted on the underside of carriage 12 engages a pinion gear 74 of drive system 70 thereby coupling the motor 58 to the carriage 12. The motor 58 also drives a second drive chain 76 off of sprocket 78 for engaging sprocket 80 which is tensioned by an idler roller 71 and drivingly coupled to one of the fuser rollers 50.

Referring still to FIG. 2 and FIGS. 3a, b, 4a, b, the drive system 70 is shown to comprise a triangular arrangement of a drive gear 82 and two driven gears 84, 86. Drive gear 82 is keyed to the shaft 88 as is drive sprocket 67 for rotation therewith. Driven gears 84, 86 are in mesh with drive gear 82 and are respectively rotatably mounted on hubs 90, 92. The driven gear 84 is coupled to the carriage pinion 74 through a friction slip clutch 94. Forward drive gear 100 is rotatably mounted on hub 91 and is in mesh with pinion 74. Hubs 91, 92 (which respectively carry forward drive gear 100 and driven gear 86) are coaxially and independently mounted so that each is normally free to turn independent of the other. Driven gear 86 is selectively coupled to forward drive gear 100 through a second friction slip clutch 96 and a solenoid actuated wrap spring clutch 98 which encompass both hubs 91, 92.

Solenoid 102 controls the operation of spring clutch 98. A rocker pin 104 is rotatably mounted on a post 106. One end of the rocker pin 104 is connected to the solenoid 102 and the other end is connected to a brake 108. Referring now to FIG. 4a, the brake 108, made of fabric, wraps around a collar 110 that houses a helical spring 112. One end of the spring 112 is fixed to the collar 110 and the other end is fixed to hub 92 of driven gear 86. The body of spring 112 encircles the separate hubs 92 and 91. Forward drive gear 100 is keyed to hub 91 and hub 92 turns with driven gear 86. As shown in FIGS. 3a, 4a where the solenoid is deactuated, the brake 108 loosely engages the collar 110, spring 112 is relaxed. The forward drive gear 100 (keyed to hub 91) is idly in mesh with carriage pinion 74 and turns clockwise therewith. Hence, the carriage is driven in its normal or homeward direction as shown by arrow 118, i.e., toward the home position. Driven gear 86 (keyed to hub 92) turns in the opposite, i.e., counter-clockwise direction.

Upon initiation of a copy cycle, solenoid 102 is actuated by the leading edge of a copy sheet which trips scan switch 42. When the latter occurs (as shown in FIGS. 3b, 4b), rocker pin 104 tightens the brake 108 around collar 110 thereby slowing down the speed of the collar 110. As the collar slows down, spring 112 comes under tension and winds itself onto hubs 91 and 92. Since hub 92 is turning counter-clockwise, i.e., in the same direction as pinion 74, the forward drive gear hub 91 is urged in the same direction as spring 112 tightens and couples the two hubs 91, 92 together to drive gear 100 in the counter-clockwise direction. The tension of spring 112 is chosen to overcome the frictional coupling of slip clutch 94 and thus turn the pinion 74 in the opposite direction to drive the carriage forward. As the carriage moves forward, the first slip clutch 94 exerts a drag on the carriage 12 and such drag tends to dampen unwanted mechanical vibrations and thereby provide a relatively smooth forward drive for the carriage. When the carriage 12 reaches the end of its forward stroke, solenoid 102 is deactuated, spring 112 relaxes, and the friction slip clutch 94 stops slipping and recouples the drive from gear 84 to pinion 74 to thereby return the carriage to its home position. In an alternative embodiment (not shown) an electromagnetic clutch can be substituted for the solenoid-rocker pin-collar arrangement of the preferred embodiment. Such clutches are available from a number of sources and one preferable clutch is the series "M" of the Marquette Company, Cleveland, OH.

Slip clutches 94, 96 not only serve the purpose of coupling the motor's drive to pinion 74 and to forward drive gear 100, but also perform a safety function. Under the influence of either clutch, the carriage 12 will slip if it abuts against an impediment, such as an accidental engagement with an operator's hand. Moreover, if the forward drive actuating solenoid 102 fails in its actuated state the forward drive slip clutch 96 will slip when the carriage 12 reaches its farthest or transfer position, where the carriage abuts against an end stop suitably mounted on the frame. By such slipping, not only is injury to the operator avoided but also injury to the machine, especially motor 58, is avoided since it will not become overloaded due to a solenoid failure or to an accidental impediment to the movement of the carriage 12.

In the preferred embodiment, drive gear 82 is a forty toothed gear that drives both gears 84, 86 counter-clockwise at 102.66 revolutions per minute (rpm). Forward drive gear 100 is a twenty-four toothed gear in mesh with pinion gear 74 that has 64 teeth. In the forward or copy stroke, the pinion 74 is driven by the twenty-four toothed forward drive gear 100 which is turning counterclockwise at 102.66 rpm. Due to the 24-to-64 toothed mesh between gears 100 and 74, the pinion 74 turns in the forward direction at three-eighths (⅜) the speed of drive gear 82. In the return direction, the pinion 74 turns faster, i.e., at the same speed as the drive gear 82. Hence, the carriage 12 is driven quickly home in order to prepare the machine for the next copy cycle.

Figure 11:
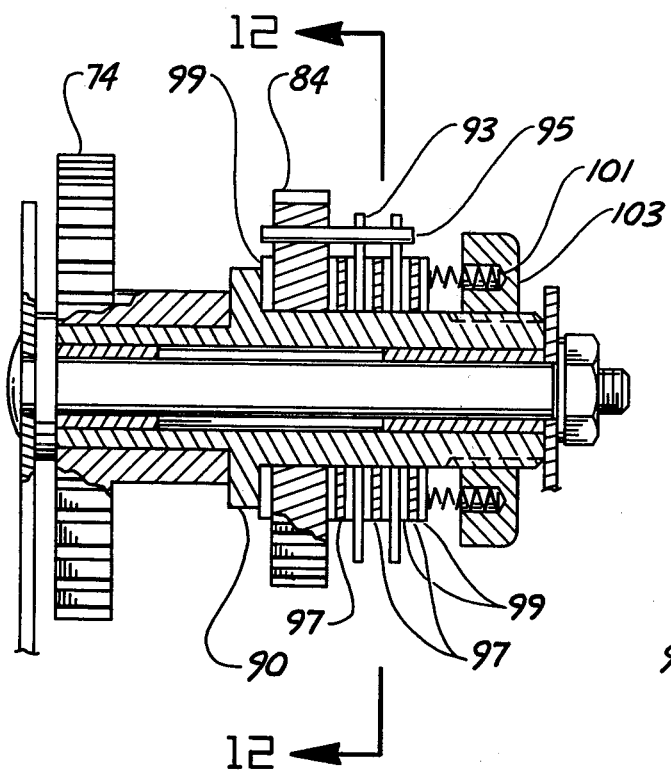
FIG. 11 is a sectional view of the slip clutch used to couple the motor drive to the pinion.
Figure 12:
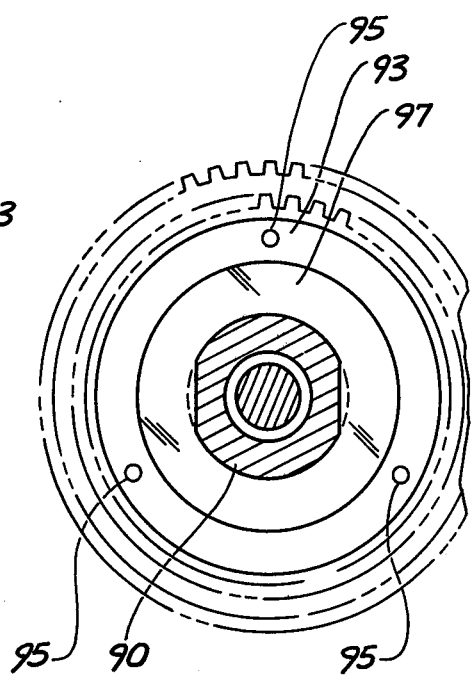
FIG. 12 is a section view of the slip clutch of FIG. 11 taken along the plane indicated by the arrows 12—12.

As mentioned earlier, the driven gears 84, 86 are respectively coupled to the pinion 74 and to the forward drive gear 100 through respective slip clutches 94, 96. Slip clutches of the kind described herein are available from Custom Products Corporation, Polyclutch Division, North Haven, Conn. and are identified by the brand name Slipper. FIGS. 11 and 12 show detailed cross sections of clutch 94 which is similar in construction and operation to clutch 96. The pinion gear 74 is keyed to a rotatable hub 90. Drive gear 84 is rotatably mounted coaxially with pinion 74 on hub 90 and is free to turn about the hub. Connecting rings 93 are also freely rotatably mounted on hub 90. Drive pins 95 couple the driven gear 84 to the connecting rings 93 so that the gear and rings turn together about hub 90. Hub 90 has flattened sections (flats) and keyed to the flats of hub 90 is a plurality of drive plates 97 as best shown in FIG. 12. A plurality of pressure plates 99, one on each side of each drive plate and one between the hub 90 and gear 84, are frictionally pressed against the drive plates 97 by coiled compression springs 101. A compression spring retaining ring 103 is threaded on hub 90 and held in position by a set screw (not shown). By adjusting the position of the retaining ring 103 along the hub 90, the frictional coupling force or torque of the clutch 94 can be varied. In the preferred embodiment, slip clutch 94 is adjusted to have a coupling torque less than slip clutch 96 so that when the wrap spring clutch 98 is engaged, the coupling provided by clutch 96 to forward drive gear 100 will be greater than the coupling on pinion 74, clutch 94 will slip under the influence of a greater, opposite torque, and the carriage 12 will move in the forward direction.

Figure 9:
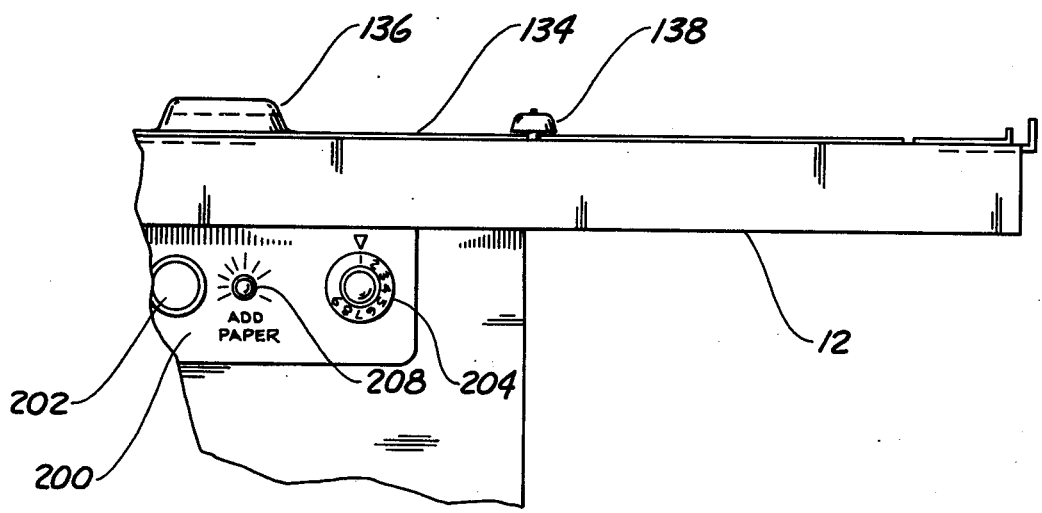
FIG. 9 is a partial elevation showing the carriage stopped when the supply roll is exhausted.

Referring now to FIGS. 5, 6, and 9 the carriage 12, seen in plan view, comprises an open rectangular frame member 130 for mounting a glass bed plate 132 on which the original document is placed face down and through which the document is scanned as it moves through illuminating station 18 (FIG. 1). Side rails 14 are mounted on opposite sides of the copier and provide a support and guide for the carriage 12 which is slidably attached to the rails 14 by ball-in-groove mounting brackets 13. Ball bearings (as shown in FIG. 6) travel in the upper and lower grooves of side rails 14 and are held in place by the U-shaped sections of brackets 13 which are mounted on the insides of the carriage 12.

Overlying the glass plate 132 is a plate cover 134 made of a flexible material and having a white surface juxtaposed to the glass plate 132. One end of the cover 134 is hinged to the carriage 12 and the other end has a handle 136. An operator can grasp the handle 136 to raise and lower the cover 134 in order to place documents on the glass plate 132 and remove them therefrom.

A copy sheet length selector 138 is slidably mounted on one side of the frame 130. Selector 138 has a score line 142. An operator normally manipulates the selector 138 to align score line 142 with the trailing edge of the document 144 placed face down on the glass plate 132, or, if desired, with a selected graduation on a copy sheet length scale 146 suitably secured to the carriage frame 130. The selector 138 carries an arm 148 which is oriented to trigger the copy paper sheet length of knife switch 54. The stationary knife switch 54 is a one way switch that has a hinged actuator arm that is biased into the path of traveling arm 148 which actuates knife switch 54 on the forward stroke of the carriage 12. On the return stroke, the arm 148 pushes the hinged arm down and out of the path of arm 148 without actuating the knife (severing mechanism) 36. In a manner well known in the art, the severing mechanism 36 is energized at the appropriate time to sever the copy paper into a sheet length selected by the positioning of selector 138. It will be appreciated that the copy paper may be severed into sheet lengths differing from the document sheet length.

As the copier makes a number of copies, the copy paper on the supply roll 28 is gradually exhausted. Because the copy sheet web is cut at various lengths, it is possible for the last section of available copy paper to be shorter than the minimum distances between the pairs of rollers 30, 40, 44 and 50 that feed and process the copy sheet. Hence, it is possible for such short pieces or slivers of copy paper to become jammed in one of the processing stations of the copier.

In the copier 10, the copy paper supply roll 28 and one of the initial feed rollers 30 are adapted to prevent the feeding of copy sheet slivers. Specifically, with reference to FIG. 7, the copy paper supply roll 28 is shown in a nearly exhausted state. Near the end of the supply, the paper is adapted to have a longitudinal slit 150. The slit 150 is centrally located in the copy paper and is in alignment with upper initial feed roller 30a. The upper feed roller 30a is a relatively narrow roller that is keyed to a rotatable shaft 152 that is drivingly coupled by belt 154 to lower feed roller 30b. As the copy sheet is incrementally withdrawn from supply roll 28 in the direction indicated by arrow 158, the leading edge of slit 150 passes through the nip of initial feed rollers 30a, b. The width of upper roller 30a is selected to be less than the width of the slit 150. Thus, once the slit passes through rollers 30a, b, (as shown in FIG. 8) the initial feed rollers will no longer engage the copy sheet.

The continuously turning charging rollers 40 will continue to draw the copy paper off the roll until the severing mechanism 36 is actuated. As a result, the operator will receive in tray 52 a final copy sheet that has a longitudinal slit in the lower portion thereof. Upon seeing a slitted copy sheet, the operator is alerted to the fact that the supply roll 28 is exhausted and a new roll is needed. In addition, a slit sensing switch 160 is disposed downstream from roller 30a and in the path of the slit 150. Switch 160 has an arm 162 that is normally held closed or down by the copy paper web. As the slit 150 passes over arm 162, it opens or rises and thereby actuates a suitable indicator such as a light 208 mounted on the control panel 200 under which a legend, ADD PAPER, is printed. Once the slit 150 passes through the initial feed rollers 30a, b, no further copies can be made until a new copy paper supply roll is provided. Hence, the slitted copy sheet and the initial feed rollers cooperate to yield a failsafe sliver feed prevention system.

Prior to discussing the electrical controls and operation of the copier 10, it is believed to be helpful to the reader to describe how the drive is supplied to and terminated from the initial feed rollers 30a, b. Referring to FIGS. 2, 7 and 8 a pulley 170 is keyed to the same shaft as roller charging drive sprocket 66. Drive belt 172 transmits the drive on pulley 170 to initial roller drive pulley 174. Spur gear 176 is keyed to the same shaft as pulley 174 for picking up the drive imparted thereto. An intermediate spur gear 178 is in mesh with the spur gear 176 and intial feed roller driving gear 155. Hence, the drive imparted to the spur gear 176 drives the feed roller 30a, b through connecting gears 178 and 155.

Intermediate gear 178 is keyed to a shaft 179 that is movable for carrying intermediate gear 178 into and out of mesh with initial feed roller driving gear 155 in accordance with the position of carriage 12. An elongated bracket 180 is pivoted about a post 182 and has an arm 184 extending above a portion of the copier frame. A tab 185 mounted on the carriage 12 contacts the arm 184 to position the bracket upright or vertical as shown in FIG. 2. At the other end of bracket 180, shaft 179 (carrying intermediate gear 178) is partially supported at one end in an opening in a lower leg 181 of bracket 180. An elongated rotatable support bracket 186 mounted on pulley and spur gear shaft 175 is coupled to and supports the other end of shaft 179. Helical spring 188 is connected between the fixedly mounted shaft 175 and the elongated portion of movable bracket 180 and is biased to move the bracket 180 in the direction indicated by arrow 192. Helical spring 190 is connected between movable shaft 179 and bracket 180 and is biased oppositely to spring 188 and serves to keep intermediate gear 178 firmly engaged with roller gear 155 while the two gears are in mesh.

When the carriage is in the home position (FIGS. 2 and 8) the bias of spring 188 is overcome by the force exerted by the carriage 12 through tab 185 on the upper arm 184 of bracket 180 so that the intermediate gear 178 couples the drive from the pulley driven spur gear 176 to the initial feed roller drive gear 155. As a copy cycle is initiated, the web of copy paper is drawn off supply roll 28 by the initial feed rollers 30a, b. After the web passes through the charging rollers and the leading edge trips scan switch 42, carriage 12 leaves its home position. Next, carriage 12 moves forward and tab 185 moves away from bracket arm 184. Under the influence of the tensioned spring 188, bracket 180 turns about pivot post 182 and in so doing the lower bracket arm 181 urges movable shaft 179 in the direction indicated by arrow 192. Ultimately, shaft 179 is moved far enough to disengage intermediate gear 178 from roller driving gear 155, thereby interrupting the drive to the initial feed rollers 30a, b. Of course, the copy sheet or web is continued along its path under the influence of the charging rollers 40 and the developer feed rollers 44.

Hence, it is readily apparent that the initial feeding of copy paper is predicated upon the carriage 12 being in its home position and no copy cycle can be initiated until carriage 12 occupies that position. Such a feature prevents the inadvertent starting of the copy process with a mispositioned carriage. In addition, the stopping of the initial feeding of the copy sheet is simply and mechanically controlled by the movement of the carriage from the home position, thus eliminating the usual electromagnetic mechanisms (sensing switches, clutches and solenoids) that are typically used in other copiers for similar control purposes.

Having thus described one of the mechanical control simplifications achieved by the invention, it is believed that the reader can more fully appreciate the following explanation of the electrical controls.

Turning now to FIG. 10, ac power is delivered to the operating components including the motor 58, lamp 20 and charging rollers 40 by operation of print button 202 which closes the contacts of print switch 203 (see also FIG. 9). Likewise, power to those stations is terminated when the carriage returns to the home position and opens the contacts of print switch 203. Scan switch 42 controls carriage drive solenoid 102, the high illumination circuit 213 and enablement of knife solenoid 35. A one-way override switch 56 is in parallel with scan switch 42 and is actuated by an elongated cam 57 that is mounted on the underside of the carriage. Cam 57 is long enough to drive the carriage at least twelve inches. The importance of the function of the override switch 56 will become apparent later. One end of knife switch 54 is connected to the carriage drive switches 42, 56. The other end of switch 54 is connected to a knife solenoid 35 that operates the knife or severing mechanism 36. By thus electrically energizing the knife switch 54 and solenoid 35 through the scan and override switches 42, 56, an accidental, premature actuation of the knife 30 is prevented. In other words, the leading edge of the copy sheet must have at least tripped the scan switch 42 at imaging station 22 before the knife 36 can be actuated. This arrangement of the scan, override and knife switches 42, 56 and 54 further serves to prevent the formation of undersized copy sheets or slivers which could become jammed in one of the copier processing stations because any copy sheet that is long enough to trip the scan switch 42 is long enough for complete processing.

Exposure lamp 20 is an incandescent lamp that is sequentially energized through two current paths. It has been found that the life of incandescent lamps in copiers can be prolonged by initially applying a small current to the lamp filaments before applying a full, operative current. The first current path is along conductor 210. A relatively large resistance $R_L$ in series with conductor 210 and lamp 20 serves to restrict the current flowing to the lamp when the print switch 203 is closed. Hence, a relatively small amount of current initially energizes and "warms up" the filament of the lamp 20. The second lamp current path is along conductor 212 that is energized through the scan and override switches 42, 56. Connected between the conductor 212 and triac 214 is a high illumination triac firing circuit 213. When the scan switch closes, the triac 214 is fired (rendered conductive) at a relatively large conduction angle so that a large amount of current is conducted to lamp 20 to heat its filaments up to an operative level of illumination in order to properly expose a document. The ADD PAPER lamp 208 is actuated by slit sensing switch 160.

Charging rollers 40 are energized by a roller charging network 216 that is essentially the same as the network described in U.S. Pat. No. 3,778,690, the entire disclosure of which is hereby incorporated by reference.

In operation, a document to be copied is placed image side down on top of the glass plate 132 of carriage 12. The leading edge of the document is aligned against registration marks (not shown) on the carriage frame 130. When the operator presses the print button 203, the charging rollers 40 are energized, the lamp 20 begins warming up, and motor 58 is energized. If the carriage 12 is not already in its home position, the drive from the motor that is coupled to the rack and pinion 72, 74 through return slip clutch 94 moves the carriage to its home position. Once home, intermediate gear 178 couples the motor drive to the initial feed rollers 30 which start drawing the web of copy paper from supply roll 28. Paper guides 38 support and direct the copy paper to the nip of the charging rollers 40. As the copy paper passes through the charging rollers, it receives a uniform electrostatic charge, and is conveyed into the imaging station 22.

When the leading edge of the copy paper trips the imaging station's scan switch 42, the following events occur substantially simultaneously. Lamp 20 is brought up to its full, operative illumination through the energized triac 214; solenoid 102 is actuated, thereby supplying a drive to forward drive gear 100 which overpowers the reverse slip clutch 94, and turns pinion 74 in a clockwise direction thereby initiating the forward or copy stroke of the carriage; knife switch 54 is energized and ready for actuation. The carriage 12 moves across the illuminating station 18 in synchronism with the passage of the copy paper through imaging station 22. The document on the carriage 12 is scanned through exposure slit 19 and the image is reflected and focused by mirror 24 and lens 26 onto the copy sheet. When the carriage leaves its home position, bracket 180 pivots and thereby disengages intermediate gear 178 from initial feed roller drive sprocket 155, thus terminating the drive to the initial feed rollers 30. The web is drawn off the supply roll 28 by charging rollers 40 until actuator arm 148 trips knife switch 54, thereby severing a copy sheet of desired length from the web.

The severed copy sheet bearing a latent electrostatic image of the document, is conveyed by feed rollers 44 through the magnetic brush developer 46. Particulate toner material carried by the magnetic brush 47 is attracted to and loosely adheres to the latent image areas of the document, thereby developing a powder image.

As the document passes from the developing station 46 into the nip of pressure fixing rollers 50, the carriage 12 continues to travel in the forward direction and such travel is assured by override switch 56. Cam 57 engages and activates switch 56 thereby maintaining the solenoid 102 in its actuated state even after the trailing edge of the copy sheet passes off of scan switch 42. Due to the relatively small dimensions of the copier, and the closely positioned copier processing stations, there is an inherent possibility that the carriage might return to the home position (which shuts off the motor) before a copy sheet (especially a five and one-half inch sheet) is fully processed. This is so because the carriage travels more quickly on its return stroke than it does on its forward or copy stroke. The override switch prevents the latter possibility from occurring by maintaining the solenoid 102 actuated until the carriage travels a distance long enough to permit the completion of the processing of the copy sheet. In the preferred embodiment, this minimum carriage drive distance is set to be twelve inches. The foregoing problem does not arise where documents longer than twelve inches are copied since the scan switch 42 will keep solenoid 102 energized until the trailing edge of the longer copy sheet pases over the switch.

After the override and scan switches 56 and 42 are opened, solenoid 102 is de-energized, the wrap spring clutch 98 disengages and the carriage 12 is driven to the home position. Upon arrival at the home position, carriage 12 opens the print switch 203 and the copier is automatically turned off. The copier 10 is also provided with a multicopy selector 204 comprising a rachet and pawl arrangement (schematically indicated by dashed line 205) for maintaining closed the contacts of print switch 203 until the selected number of multiple copies is completed in a manner well known in the art.

What is claimed is:

1. In an electrophotocopy machine having an illuminating station for illuminating an original document, a carriage for carrying an original document in transit from a home position across the illuminating station and back to the home position, a motor drivingly connectable to the carriage for reciprocally driving the carriage; a drive system comprising:
   first coupling means for drivingly connecting the motor to the carriage with a first predetermined torque acting in one direction in order to normally drive the carriage toward the home position,
   second coupling means actuable for drivingly connecting the motor to the carriage with a second predetermined torque, greater than the first predetermined torque and acting in a direction opposite thereto, in order to drive the carriage across the illuminating station, means for actuating said second coupling means for an interval of time long enough for the carriage to carry the document across the illuminating station whereby the first predetermined torque continues to act on the carriage to maintain a substantially constant drag thereon in order to dampen irregular motion of the carriage and thus smoothly move the carriage across the illuminating station.

2. The invention of claim 1 wherein said first coupling means comprises a first clutch for frictionally connecting the motor to the carriage with a first predetermined torque acting in one direction for driving the carriage toward the home position.

3. The invention of claim 2 wherein said second coupling means comprises a second clutch operable for frictionally connecting the motor to the carriage with a second predetermined frictional torque greater than the first torque and acting in an opposite direction to overcome the first torque and slippingly drive the carriage across the illuminating station.

4. The invention of claim 1 wherein the means for actuating said second coupling means comprises a magnetic, electrically energizable wrap spring clutch connected between the second coupling means and the carriage and normally idly connected to the carriage.

5. In an electrophotocopy machine having a reciprocating carriage for supporting a document in transit from a home position across an illuminating station and back to the home position during a copy cycle, a drive system comprising:
   a rack mounted on the carriage,
   a pinion in mesh with said rack,
   a motor drivingly connectable to the pinion,
   a first slip clutch for frictionally connecting the motor to the pinion with a first predetermined frictional torque acting in one direction for driving the carriage toward the home position,
   a second slip clutch frictionally connected to the motor with a second predetermined frictional torque greater than the first predetermined frictional torque and acting in an opposite direction thereto,
   a spring clutch connected between the pinion and the second slip clutch, normally turning idly with the pinion and actuable for coupling the second slip clutch to the pinion.
   means for actuating and deactuating the spring clutch at respective predetermined intervals during a copy cycle whereby the frictional torque of the second slip clutch overcomes the frictional torque of the first slip clutch and the carriage is driven across the illuminating station until the spring clutch is deactuated and the carriage is driven back toward its home position.

6. The invention of claim 5 wherein the spring clutch comprises a helical spring connected between the second slip clutch and the pinion for normally turning idly therewith.

7. The invention of claim 6 wherein the means for actuating the helical spring comprises a brake wrapped around the helical spring and a solenoid connected to the brake, said solenoid being actuable to pull the brake against the helical spring in order to couple the second slip clutch to the pinion through the spring.

8. The invention of claim 6 wherein the means for actuating the helical spring comprises an electromagnetic clutch connected between the spring and the second slip clutch and actuable to couple the slip clutch to the reversing gear through the spring.

* * * * *